United States Patent [19]

Suzuki et al.

[11] 4,389,675
[45] Jun. 21, 1983

[54] TELEVISION CAMERA APPARATUS

[75] Inventors: Susumu Suzuki, Ayase; Akitoshi Okuma, Yokohama, both of Japan

[73] Assignee: Sony Corporation, Tokyo, Japan

[21] Appl. No.: 249,655

[22] Filed: Mar. 31, 1981

[30] Foreign Application Priority Data

Apr. 5, 1980 [JP] Japan ............................. 55-46016[U]

[51] Int. Cl.³ .............................................. H04N 5/26
[52] U.S. Cl. .................................... 358/229; 358/224
[58] Field of Search .................. 358/229, 224; 354/81, 354/223, 288, 293

[56] References Cited
U.S. PATENT DOCUMENTS

| 3,434,406 | 3/1969 | Aune | 354/293 |
| 3,913,116 | 10/1975 | Kastner | 354/223 |
| 3,931,630 | 1/1976 | Crawford | 354/223 |
| 4,083,480 | 4/1978 | Lee | 354/293 |

*Primary Examiner*—Michael A. Masinick
*Attorney, Agent, or Firm*—Hill, Van Santen, Steadman, Chiara & Simpson

[57] ABSTRACT

A portable television camera which can be adapted for right-handed and left-handed users in which the handgrip, an electronic view finder with an eye cap and a shoulder pad are designed so as to be interchangeably attached to a camera body housing to adapt the camera to either right or left-handed users.

3 Claims, 15 Drawing Figures

TELEVISION CAMERA APPARATUS

BACKGROUND OF THE INVENTION

1. Field of the Invention

This invention relates in general to a portable television camera apparatus and more particularly to a portable television camera apparatus which can be used by right-handed or left-handed users.

2. Description of the Prior Art

Prior portable television cameras have been designed so that they are convenient for use by a right-handed user. Such cameras are difficult to handle by a left-handed user because the view finder and handle are on the wrong side for a left-handed user. Some cameras have also been designed without consideration of whether the person is right-handed or left-handed but such cameras are inconvenient and awkward for use by either left or right-handed users.

SUMMARY OF THE INVENTION

It is an object of the present invention to provide a portable television camera apparatus in which the mounting positions of the respective parts which are required to be changed for right and left-handed users can be easily interchanged.

Yet another object of the invention is to provide a portable television camera in which an electronic view finder is mounted in the proper relationship for either left or right-handed users.

Yet another object of the invention is to provide a portable television camera apparatus in which the mounting angle of the electronic view finder can be changed merely by pushing it by hand.

According to the invention, a portable television camera includes (A) a camera body housing having a lens mount to which a lens body is mounted; (B) a shoulder brace which is secured at the bottom of the camera body housing; (C) a hand grip mount which is provided on and extends from the shoulder brace to which a handgrip is attached, with the handgrip mount being so constructed that the handgrip can be interchangeably mounted on either side of the arm and (D) a view finder mount provided on the camera body housing to which an electronic view finder having a small size cathode ray tube can be attached and the view finder mount is arranged to hold the electronic view finder on either side of the camera body housing for either right or left-handed users.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
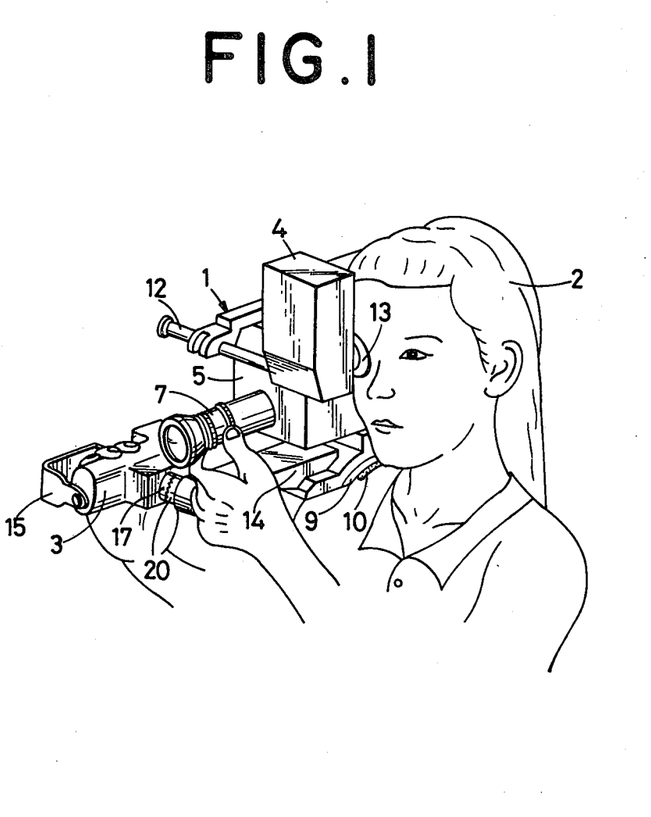
FIG. 1 is a perspective view of a portable television camera according to one embodiment of the invention being used by a right-handed person.
Figure 2:
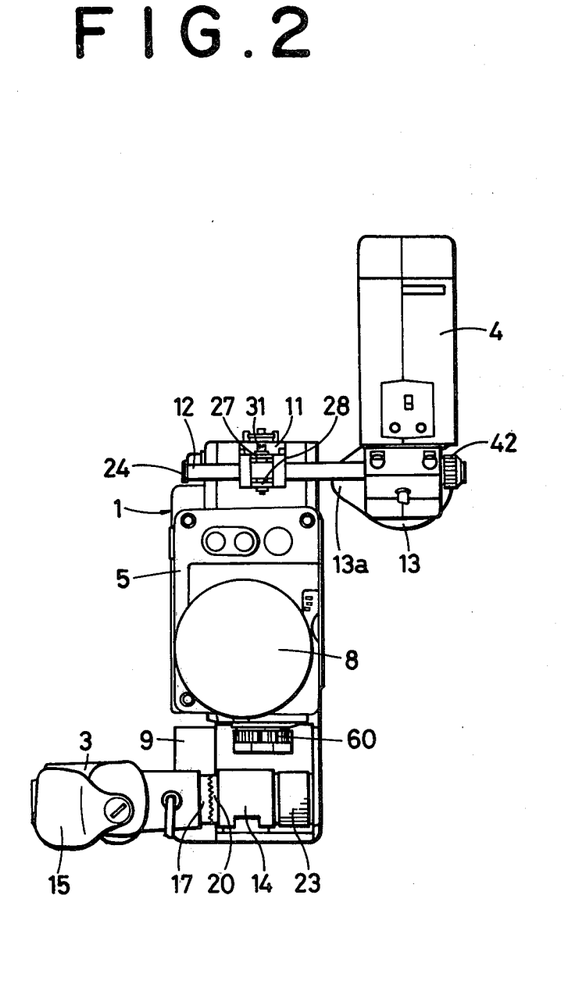
FIG. 2 is a front view of the portable television camera of FIG. 1.

The portable television camera 1 according to one embodiment of the invention is illustrated in FIGS. 1 through 5. A battery housing 6 is attached to the back portion of the camera body housing 5. A lens mount 7 is attached to the front side of the camera body housing 5, and a cap 8 is attached to the outer ends of the lens mount 7. An arcuate shoulder engaging brace 9 is attached to the lower side of the camera body housing 5 and a shoulder pad 10 is attached to the arcuate shoulder brace 9. An arm 11 is fixed on an upper front side of the camera body housing 5 and extends generally forward parallel to the lens mount 7. A horizontal support shaft 12 is attached to the end of the arm 11 which extends from the housing 5. An electronic view finder 4 is mounted on the support shaft 12 so that it can be rotated relative to the support shaft as are illustrated by arrows a and b in FIGS. 3 and 4. An eye cap 13 is attached to the view finder 4. A substantially horizontal arm 14 is attached to the front of the shoulder brace 9 and a handgrip 3 is attached to the outer end of the arm 14. A gripping band 15 is mounted on the handgrip 3 as illustrated in FIG. 1 for example. A zoom control button 16 and VTR start button are mounted on the backside of the handgrip 3 for operation of the camera.

Figure 3:
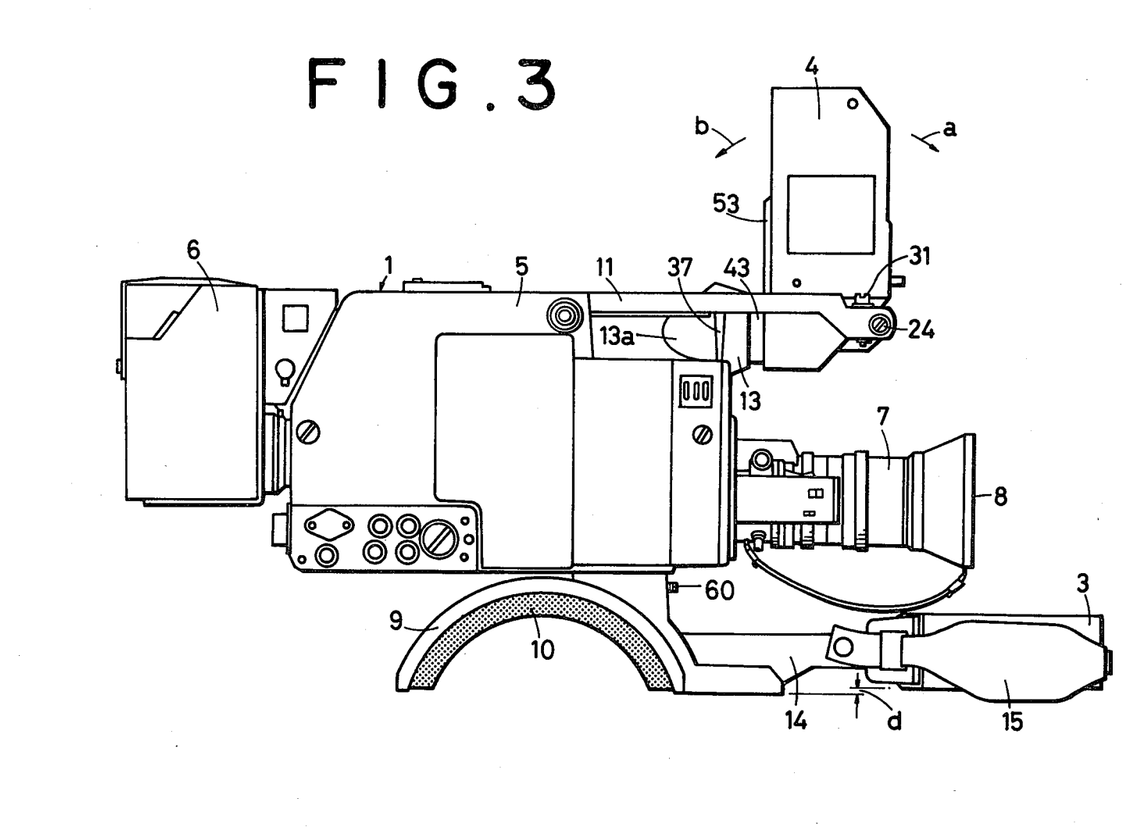
FIG. 3 is a plan view from the right side of the portable television camera of FIG. 1.

The shoulder brace 9 is fixed to the camera body housing 5 and the arm 14 extends horizontally from the shoulder brace 9. As shown in FIG. 3, the handgrip 3 is attached horizontally to the outer end of the arm 14. As shown in FIG. 3, the lower surface of the shoulder brace 7 is designed such that it is nearly as long as the length of the camera body housing 5. Thus, the camera can be stably supported on a desk or other means by the shoulder brace 9 and the arm 14 and handgrip 3. When not in use, the portable camera 1 is often placed on a desk, table or other supporting means and this feature is very convenient so that the camera will not fall or be jarred.

As illustrated in FIG. 1, the camera can be placed on the right shoulder of a right-handed user 2. If the user is left-handed, the placement of the handgrip 3 and the view finder 4 is inconvenient and according to the invention, the mounting positions of the handgrip 3, the view finder mount 4, the eye cap 13 and the shoulder pad 10 can be interchanged relative to the camera body housing 5 for a left-handed user.

Figure 6:
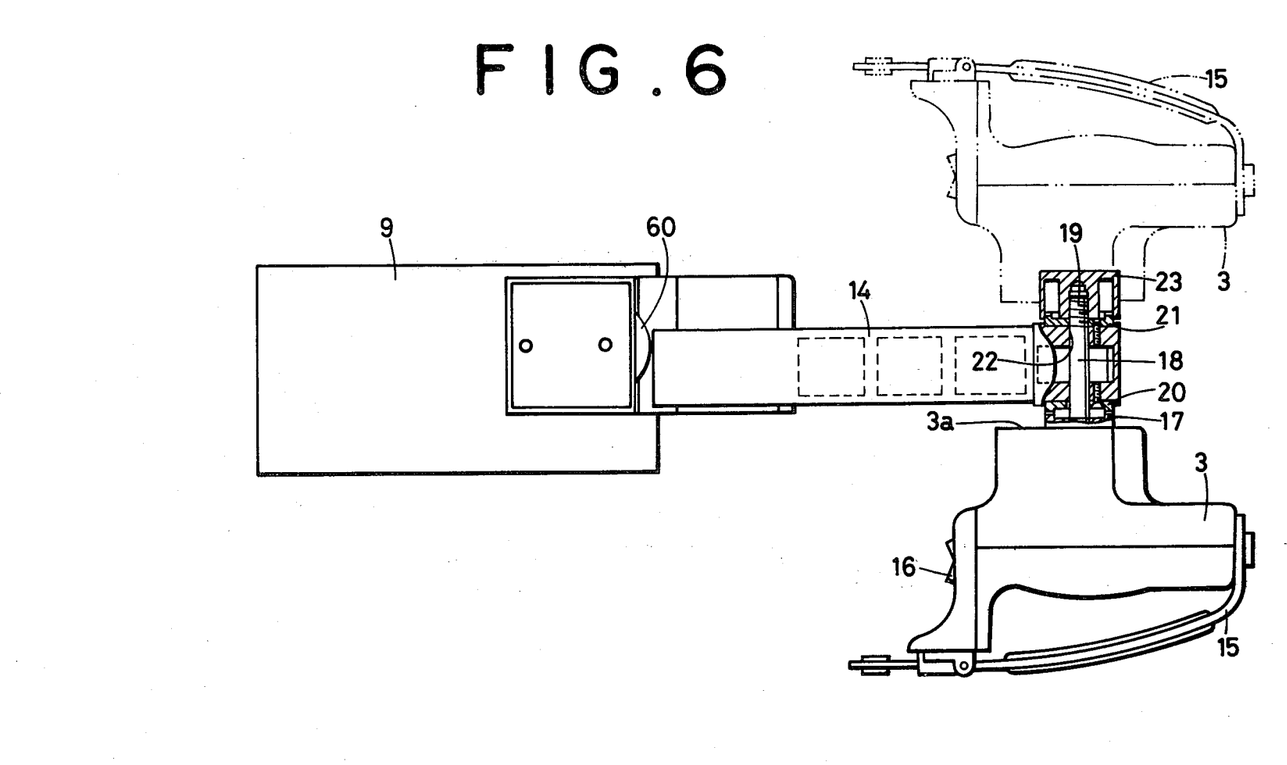
FIG. 6 is a partly broken away plan view of a mechanism for mounting the handgrip in the camera of FIG. 1.

FIG. 6 illustrates the mounting mechanism for the handgrip 3. A mounting shaft 18 and a crown gear 17 extend from the mounting surface 3a of the handgrip 3.

Threads 19 are formed on the outer end portion of the mounting shaft 18 as shown. The outer end of the arm 14 is formed with an opening through which the shaft 18 extends. Crown gears 20 and 21 which have serrated end surfaces are fixed on the sides of the outer end portion of the arm 14 as shown. When the mounting shaft 18 is inserted through the mounting opening 22, the crown gear 17 which has a serrated end surface engages with the serrated end surface of the gear 20. A nut 23 is threaded onto the threaded end 19 of the shaft 18 so as to fix the handgrip 3 to the arm 14. The mounting angle of the handgrip 3 can be changed by loosening the nut 23 and changing the angular position due to the serrated surfaces of the mating surfaces of the gears 17 and 20. After the rotational adjustment of the handgrip 3 is set to the desired position, the nut 23 is retightened so as to firmly attach the handgrip to the arm 14.

In FIG. 6, the solid line view of the handgrip 3, illustrates the position in which it would be mounted for a right-handed user. For placing the handgrip 3 for a left-handed user, the nut 23 would be removed from the shaft 18 and the handgrip 3 and the shaft 18 would be removed from the opening 22 and the handgrip would be reinserted on the upper or other side relative to FIG. 6 after which the nut 23 would then be tightened on the threaded end 19 of the shaft 22. The dot-dash line illustrates the position of the handgrip 3 for a left-handed user. When the handgrip 3 is in the left-hand position, the crown gear 17 engages the serrated surface of the crown gear 21 and the nut 23 engages the crown gear 20. Thus, the handgrip 3 can be moved to either the left or right side of the cam for left or right-handed users.

The view finder 4 can also be moved as illustrated in FIGS. 7 through 10 for left and right-handed users. The view finder 4 is used for monitoring pictures which are being picked up by the camera and it contains a small size cathode ray tube and picture receiving circuits which are viewed by the user so as to see the picture which will be scanned by the camera as well as for focusing the camera. The view finder 4 is supported by the support shaft 12 which is attached to the outer end of the arm 11 so that the view finder 4 can be rotated relative to the shaft 12 as indicated by arrows a and b shown in FIGS. 3, 4 and 10. As illustrated in FIGS. 7A, the supporting shaft 12 has a larger diameter portion 12a which is connected by a tapered portion 12c to a smaller diameter portion 12b. About three fourths of the larger diameter portion 12a is partially cut so as to form a flat 12d shown to the left in FIG. 7A. After the supporting shaft 12 is attached to the arm 11, a screw 24 is threadedly received into an opening formed in one end of the supporting shaft 12 and has a head larger than the diameter of the portion 12a such that when the shaft 12 passes through an opening formed in the arm 11 the head of the screw 24 will prevent the shaft 12 from being removed from the portion 11 without removing the screw 24.

Figures 7A, 7B:
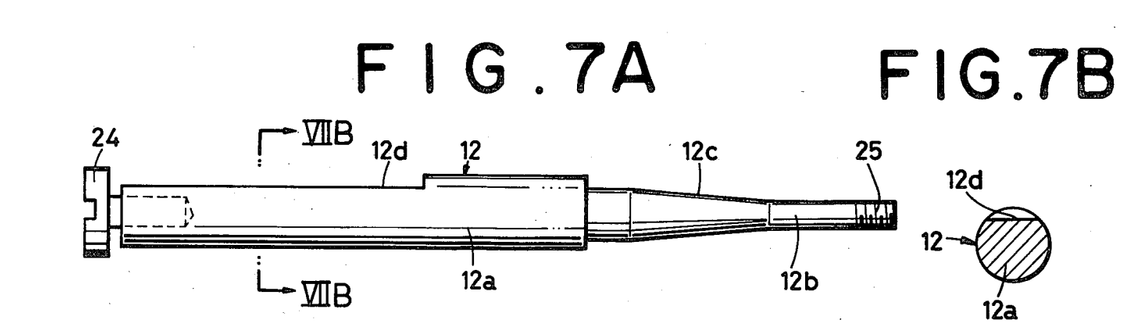
FIG. 7A is a plan view of a supporting shaft used in the camera of FIG. 1.
FIG. 7B is a cross-sectional view taken along line VIIB—VIIB in FIG. 7A.

The end of small diameter portion 12b is formed with a threaded portion 25.

Figure 8:
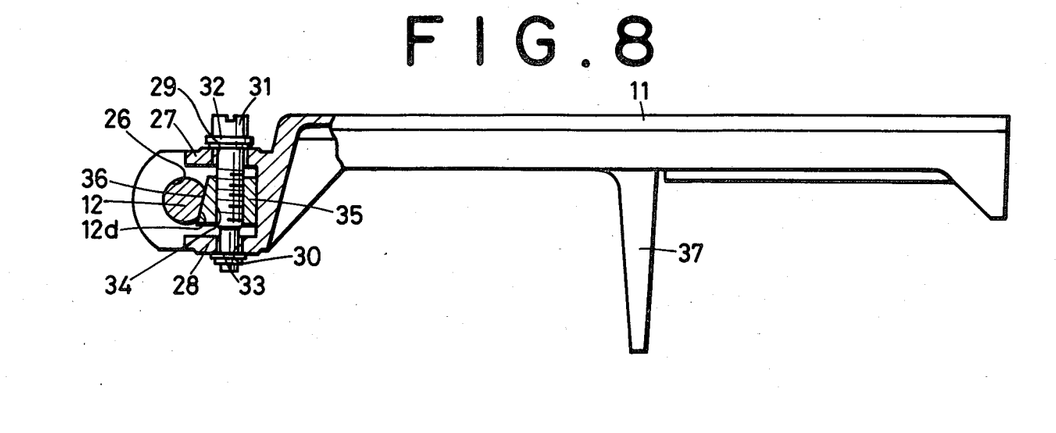
FIG. 8 is a partly broken away plan view of a supporting mechanism for supporting the supporting shaft in the camera of FIG. 1.

FIG. 8 illustrates the arm 11 and the supporting shaft 12. An opening 26 is formed in arm 11 and the supporting shaft 12 extends through the opening 26 at the outer end of the arm 11. The opening 26 has the same shape as the hatched portion illustrated in FIG. 7B so that the shaft 12 will not turn in the opening 26. The end portion of the arm 11 has upper and lower supports 27 and 28 through which holes 29 and 30 are formed and a locking screw 31 is receivable through the holes 29 and 30. Flanges 32 and 33 are fixed on the locking screw 31 for holding it in the holes 29 and 30 so that it cannot fall out of the holes. A locking block 35 has a threaded portion 34 through which the threads of the locking screw 31 extend and mate. A tapered surface 36 of the locking block 35 engages the flat 12d of the supporting shaft 12.

When the locking block 35 is moved upwardly and downwardly by rotating the locking screw 31 clockwise and counterclockwise the portion 12d of the shaft 12 will be locked or unlocked to the arm 11. Thus, by rotating the screw 31 so that the locking block 35 moves upwardly relative to FIG. 8 will cause the tapered surface 36 of the locking block 35 to press against the flat 12d of the supporting shaft 12 to lock the shaft 12 so that it cannot be moved relative to the arm 11. By rotating the shaft 31 so that the locking block 35 moves downwardly, thus loosening the tapered surface 36 relative to the surface 12d of the shaft 12 will allow the shaft 12 to be moved through the opening 26 of the arm 11 and removed therefrom by removing the bolt 24 from the end of shaft 12. Although the bolt 31 as shown has a slotted head, it may also have a thumb screw attached thereto so that it can be manually turned. An extending projection 37 is connected to the arm 11 at about its center portion and the extension 37 can be used as a handle for gripping and carrying the mechanism.

Figure 9:
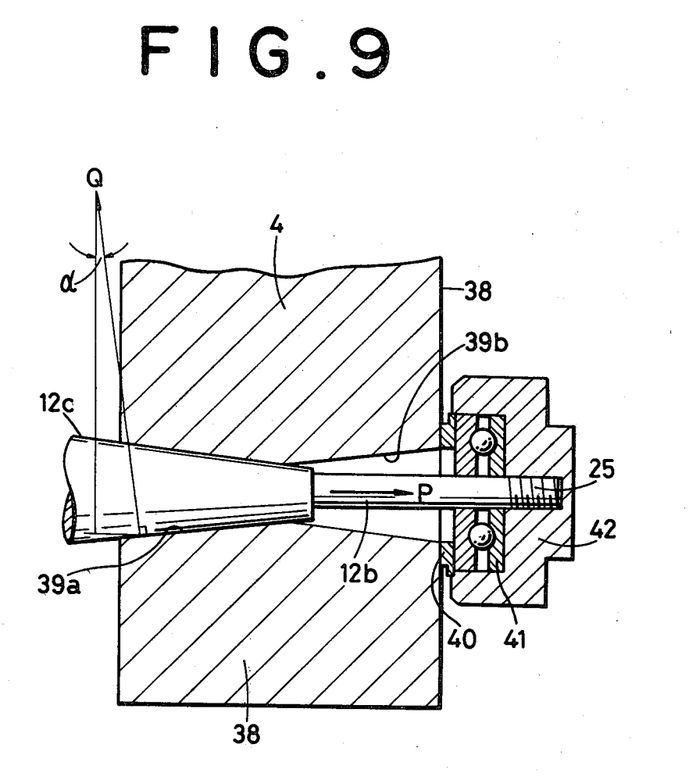
FIG. 9 illustrates an enlarged cross-sectional view of a frictional combination mechanism for supporting a view finder in the camera of FIG. 1.
Figure 10:
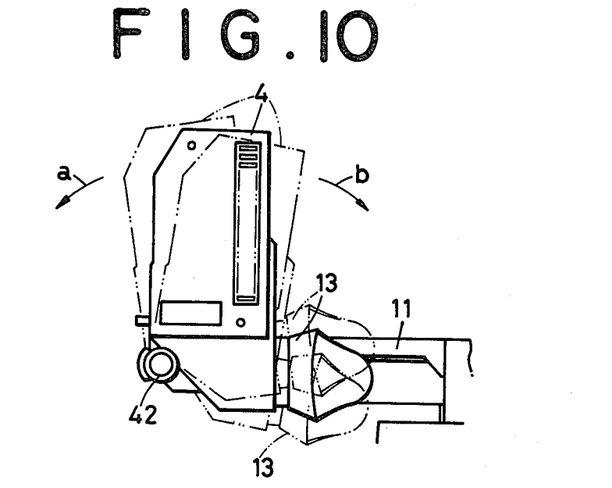
FIG. 10 is a side view of the view finder of FIG. 1.

As shown in FIGS. 9 and 10, the view finder 4 is supported on the tapered portion 12c and end 12b of the shaft 12. As shown by the dash-dot lines in FIG. 10, the view finder 4 can be inclined from its solid line position at arbitrary angles around the supporting shaft as shown by the arrows a and b. The view finder 4 can be merely moved by hand to the desired angle. It can be firmly locked by a friction combination mechanism illustrated in FIG. 9.

A V-shaped tapered hole 39 is formed in a lower portion 38 of the view finder 4. The tapered portion 12c of the supporting shaft 12 and the smaller diameter portion 12b are inserted through the V-shaped opening 39. The V-shaped opening 39 has tapered wall portions 39a and 39b as illustrated in FIG. 9 which are inclined at opposite angles to each other. In FIG. 9, when the supporting shaft 12 is inserted into the V-shaped opening 39 from the left side relative to the Figure, the tapered portion 12c of the supporting shaft 12 mates with the tapered wall 39a. When the supporting shaft 12 is inserted into the V-shaped opening 39 from the right side relative to FIG. 9, the tapered portion 12c of the supporting shaft will mate with the tapered wall portion 39b. In FIG. 9, the threaded portion 25 of the smaller diameter portion 12b of the supporting shaft extends outwardly from the right side of the view finder 4 and a nut 42 is threadedly received on the threaded portion 25. A washer 40 and a thrust bearing 41 is mounted between the nut 42 and the view finder 4 as shown. The force exerted by the nut 42 reacts on the washer 40 and thrust bearing 41 on a side surface 38a of the lower portion 38 of the view finder 4 and as a result a force P is produced so as to draw the supporting shaft 12 into the tapered opening 39. The force P causes a force Q normal to the contact surface between the tapered portion 12c of the supporting shaft 12 and the tapered wall portion 39a of the V-shape opening 39. The relationship between the forces P and Q is given by the following equation:

$$Q = \frac{P}{\sin\alpha}$$

where $\alpha$ represents the angle of taper of the tapered walls 39a and 39b and the taper angle of the portion 12c of the supporting shaft 12. In a specific example the taper angle $\alpha$ was a Morse taper according to Japanese Industrial Standard of about 1/19 and the sin $\alpha$ was about equal 1/38 and Q was equal to 38P. When the frictional coefficient of the contacting surface is $\mu$, the view finder 4 will be supported by a force of $W = \mu \cdot Q (= \mu \times 38P)$ which is a large frictional force. Accordingly, the view finder will be firmly supported on the supporting shaft 12 at the fixed set angle. The inclination angle of the view finder 4 can be easily adjusted by pushing the view finder 4 by hand. The thrust bearing 41 functions to prevent the nut 42 from loosening during rotation of the view finder 4. The screw 25 in a particular example was a left-handed screw or a reverse handed screw.

To change the mounting position of the view finder 4 the nut 42 is loosened and the nut 42, the washer 40 and the thrust bearing 41 are separated from the supporting shaft 12. The view finder 4 is then removed from the supporting shaft 12. Then the locking screw 31 illustrated in FIG. 8 is loosened so that the supporting shaft 12 can be removed from the arm 11. Then the supporting shaft 12 is inserted through the hole 26 of the arm 11 from the opposite side and it is locked to the arm 11 by the locking screw 31. The view finder 4 is then mounted on the supporting shaft so that the tapered portion 12c of the supporting shaft 12 mates with the second tapered wall portion 39b and the washer 40 and the thrust bearing are threaded onto the threaded portion 25 of the supporting shaft 12 on the other side of the view finder 4 relative to FIG. 9. The nut 42 is tightened and the arm 12 extends from the right side rather than the left side relative to FIG. 9. Thus, the view finder 4 can be mounted on the supporting shaft on either the right or left side of the camera body housing at the same height by removing the nut 42 as described above. During the interchanging operation of the mounting position of the view finder 4 the scanning direction of the view finder 4 does not need to be changed.

Although the above described friction combination mechanism is used as a supporting mechanism for the view finder 4, it can also be used for other purposes. Particularly, it is advantageous if an object having more than a small weight is to be firmly held at an arbitrary angle and the inclination of the angle should be adjusted. Generally, this mechanism can be used where two objects are combined relative to each other and are to be rotatable relative to each other then the inclination angle of the one object to the other must be adjusted or, alternatively, must be firmly held and the mechanism can be used for these purposes.

Figure 11:
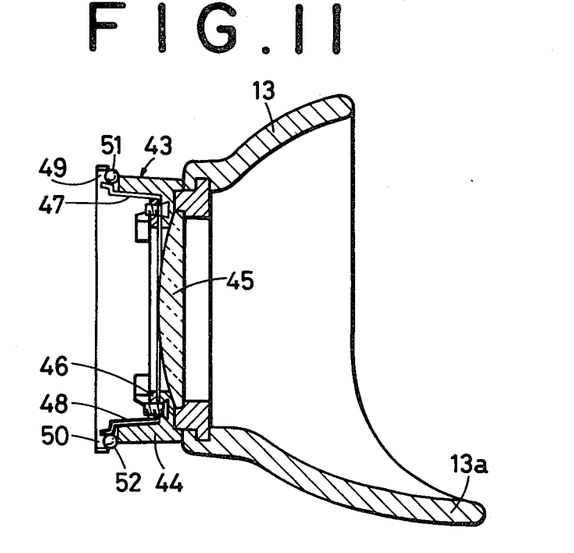
FIG. 11 is an enlarged cross-sectional view of the eye cap and lens holder of the camera of FIG. 1.
Figure 12:
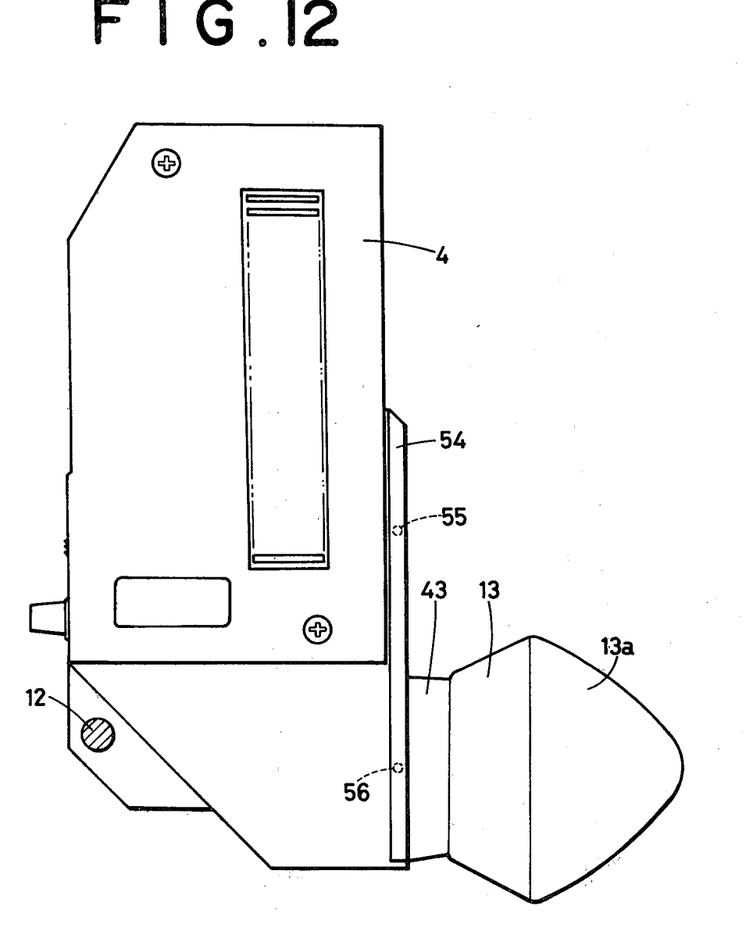
FIG. 12 is an enlarged side plan view of the mechanism for mounting the lens holder in the camera of FIG. 1.

FIGS. 11 and 12 illustrate the mechanism for mounting the eye cap 13 and the lens holder 43. The eye cap 13 is attached to the lens holder 43 as shown in FIG. 11. The eye cap 13 may be formed of rubber and a projection 13a is formed in the eye cap 13 and engages the side portion of the eye in use by the operator. Since the eye cap 13 includes the projection 13a, it is necessary that the mounting position of the eye cap 13 be interchangeable for right hand and left-handed users. The mounting position of the eye cap 13 can be interchanged by turning over or rotating the lens holder 43. The lens holder 43 includes a casing 44 having a square section. A lens 45 and a lens fixer or holder 46 are mounted in the lens holder 43. Leaf springs 47 and 48 are arranged along the inner opposite walls of the casing 44. Steel balls 51 and 52 are received into recesses 49 and 50 formed in the end portion of the casing 44 and they are flexibly held by the leaf springs 47 and 48.

Figure 4:
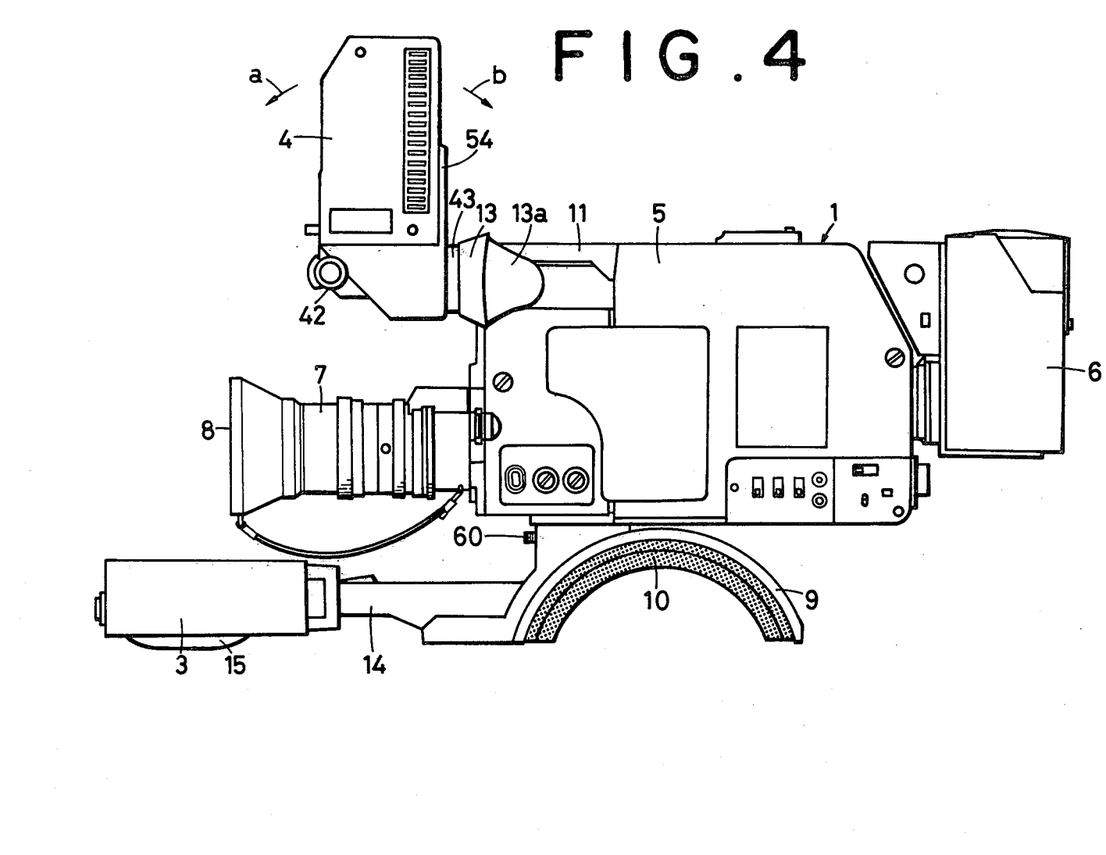
FIG. 4 is a plan view from the left side of the portable television camera of FIG. 1.
Figure 5:
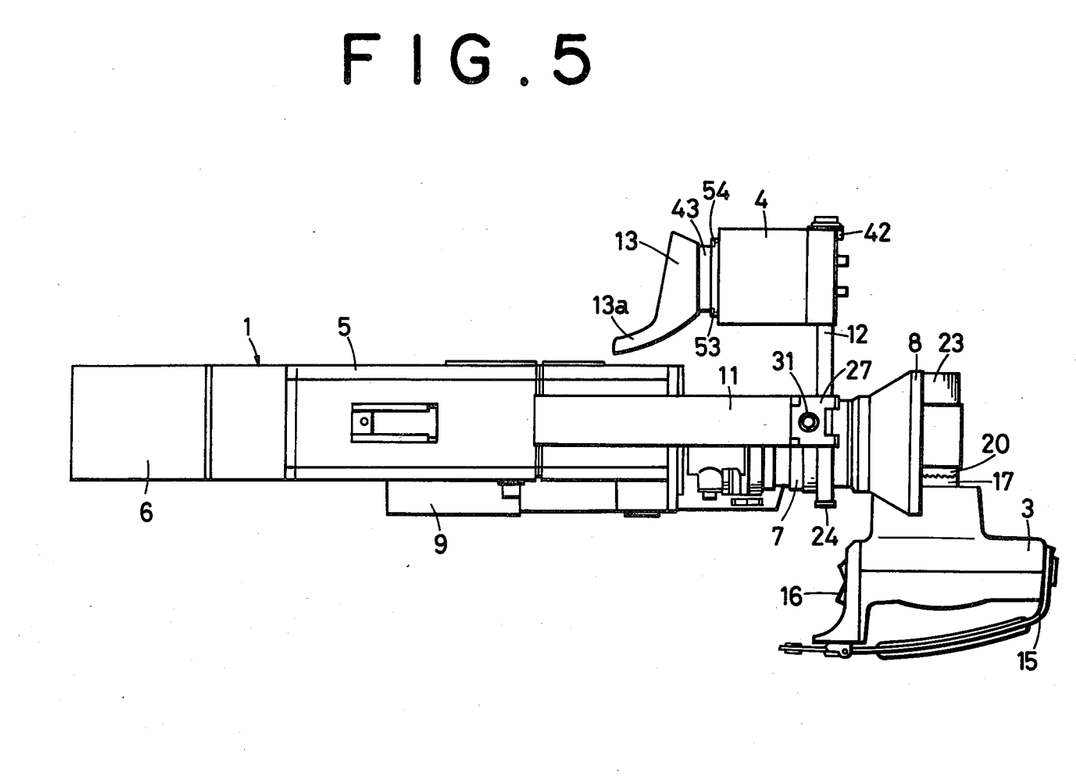
FIG. 5 is a plan view of the portable television camera of FIG. 1.

As illustrated in FIG. 3, FIG. 4 and FIG. 12 a pair of guide rails 53 and 54 which have U-shaped cross-section are fixed on one side surface of the view finder 4. The steel balls 51 and 52 are rotatably received by the guide rails 53 and 54 so that the lens holder 43 is attached to the view finder 4. Locking recesses 55 and 56 are formed in the guide rails 53 and 54. When using the lens holder 43, the steel balls 51 and 52 engage with the recesses 55 to lock the lens holder 43 to the view finder 4. When the lens holder is not being used, the steel balls 51 and 52 engage the recesses 56 to lock the lens holder 43 to the view finder 4.

As shown in FIG. 12, the eye cap 13 is positioned for right-handed users. When the mounting position of the eye cap 13 is changed for a left-handed user, the lens holder 43 together with the eye cap 13 is moved upwardly along the guide rails 53 and 54 and it is taken out of the guide rails 53 and 54. The lens holder 43 together with the eye cap is then turned over and then it is again inserted into the guide rail 53 and 54 with the projection 13a of the eye cap 13 extending to the left side of the face for the left-handed user.

Figure 13:
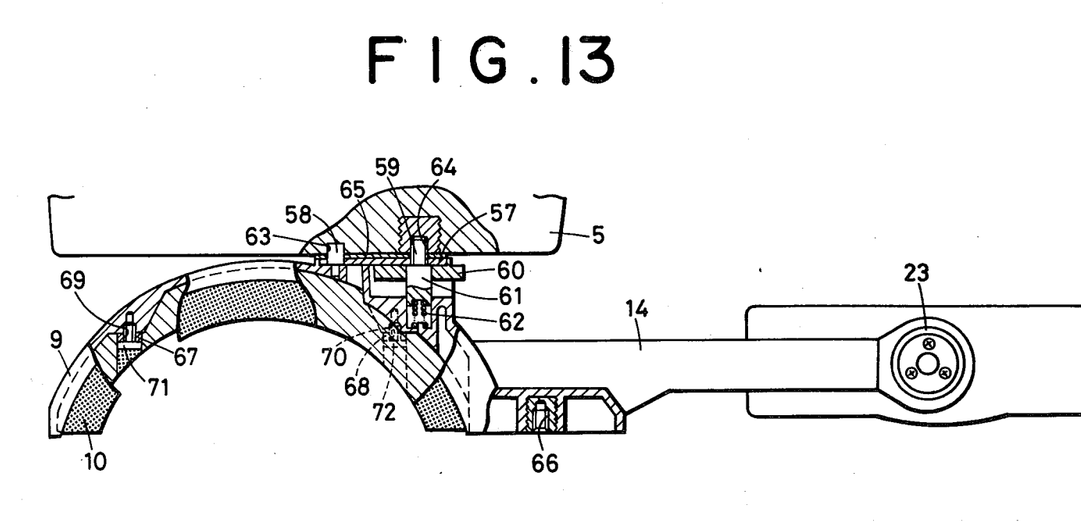
FIG. 13 is a partly broken away side plan view of a shoulder brace of the camera of FIG. 1.

FIG. 13 illustrates the manner of mounting the shoulder brace 9 and the shoulder pad 10. The width of the shoulder brace 9 is approximately equal to the length of the camera body housing 5 and the shoulder brace 9 is arcuately formed. The arm 14 is formed integrally with the shoulder brace 9 and the brace 9 is demountably attached to the lower surface of the camera body housing 5 by means of screws.

A camera supporting plate 57 is mounted on the shoulder brace 9. A pin 59 extends upwardly on the camera support in plate 57. A screw 59 is inserted through an opening formed in the camera support plate 57. A knob 60 and a shank portion 61 are integrally formed with the screw 59. The shank 61 is urged upwardly by a spring 62 arranged in the shoulder brace 9. A recess 63 is formed in the lower surface of the camera body housing 5 and the pin 58 is received therein. Threaded opening 64 is formed in the lower surface of the camera body housing 5 and receives the screw 59. The pin 58 fits into the recess 63 and the screw 59 is screwed into the screw hole 64 by rotating the knob 60. Thus, the camera body housing 5 is positioned on the shoulder brace 9 and they are connected to each other. In addition, a rubber cushion 65 is interposed between the camera support plate 57 and the camera body housing 5. The camera body housing 5 is firmly held by the pin 58 and the screw 59 so they do not move relative to each other.

The camera 1 can be used not only as shoulder mounted but also can be mounted on a tripod. The tripod can be used not only with the shoulder brace 9, but also without the shoulder brace 9. When the tripod is used together with the shoulder brace 9, its threaded opening 66 formed in the rear end portion of the arm 14 is used to receive the tripod. When the tripod is used without the shoulder brace 9, a threaded opening 64 formed in the lower surface of the camera body 5 is used for the tripod.

Figure 14:
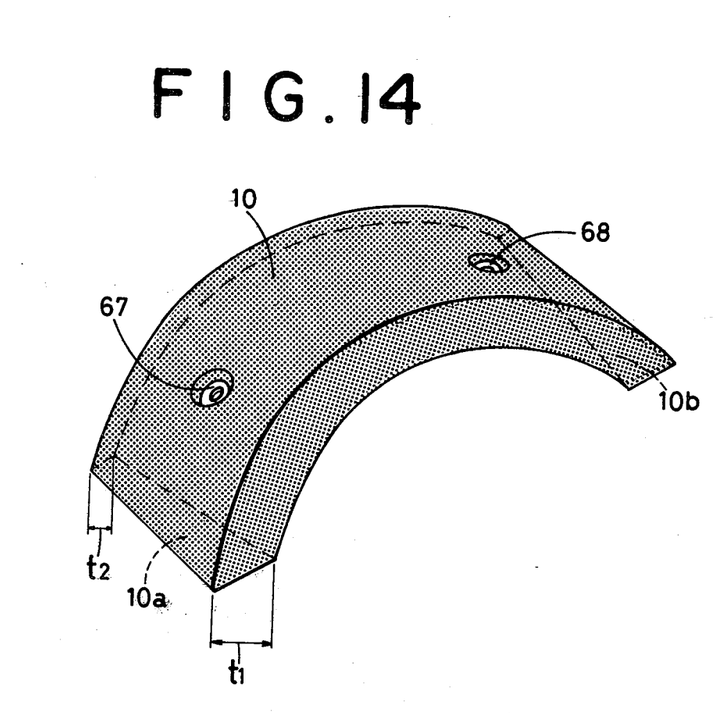
FIG. 14 is a perspective view of the shoulder pad of the camera of FIG. 1.

The shoulder pad 10 is shaped as shown in FIG. 14. The thickness $t_1$ of the outer wall is larger than the thickness $t_2$ of the inside wall. The bottoms 10a and 10b are narrower toward the inside so that the shoulder pad 10 suitably fits the shoulder of the user. It is desirable that the mounting position of the shoulder pad 10 be interchangeable for right-handed and left-handed users. For this purpose, rings 67 and 68 with screw holes formed therethrough are embedded in the shoulder pad 10. The shoulder pad 10 can be attached to the shoulder brace 9 by the screw 71 and 72 which extend through the screw holes 69 and 70 of the shoulder brace 9. Thus, to change the shoulder pad from the position illustrated in FIG. 14, the screws 71 and 72 are removed and the shoulder pad is reversed and then reattached by reinserting the screws 71 and 72 through the screw hole 69 and 70.

Although the invention has been described with respect to preferred embodiments, it is not to be so limited as changes and modifications can be made which are within the full intended scope of the invention as defined by the appended claims.

We claim as our invention:

1. A portable television camera apparatus comprising:
   (A) a camera body housing having a lens mount to which a lens body is mounted;
   (B) a shoulder brace secured to a bottom portion of said camera body housing;
   (C) a handgrip and mount provided on an arm which extends from said shoulder brace, said handgrip mount constructed as that said handgrip can be interchangeably mounted on either side of said arm; and
   (D) a view finder mount including a mounting rod which extends laterally from said camera body and on which said electronic view finder is secured, to interchangeably mount said electronic view finder on either side of said camera body.

2. A portable television camera apparatus according to claim 1, wherein said mounting rod has a tapered portion and said electronic view finder has a tapered opening through which said rod extends and said view finder secured by friction to said rod.

3. A portable television camera apparatus according to claim 2, wherein said tapered opening formed in said view finder housing has a V-shaped taper for accepting said mounting rod from either side of said opening.

* * * * *